United States Patent
Hill et al.

(10) Patent No.: US 11,429,623 B2
(45) Date of Patent: Aug. 30, 2022

(54) SYSTEM FOR RAPID INTERACTIVE EXPLORATION OF BIG DATA

(71) Applicant: TIBCO SOFTWARE INC., Palo Alto, CA (US)

(72) Inventors: Thomas Hill, Palo Alto, CA (US); David Katz, Palo Alto, CA (US); Michael O'Connell, Palo Alto, CA (US); Jags Ramnarayan, Palo Alto, CA (US); Daniel J. Rope, Palo Alto, CA (US)

(73) Assignee: TIBCO Software Inc., Palo Alto, CA (US)

( * ) Notice: Subject to any disclaimer, the term of this patent is extended or adjusted under 35 U.S.C. 154(b) by 146 days.

(21) Appl. No.: 16/738,999

(22) Filed: Jan. 9, 2020

(65) Prior Publication Data
US 2021/0216544 A1  Jul. 15, 2021

(51) Int. Cl.
*G06F 16/2458* (2019.01)
*G06F 16/248* (2019.01)

(52) U.S. Cl.
CPC ........ *G06F 16/2465* (2019.01); *G06F 16/248* (2019.01)

(58) Field of Classification Search
CPC .......... G06N 20/00; G06N 7/005; G06N 5/04; G06N 3/08; G06N 3/04; G06N 5/003; G06N 5/045; G06N 7/00; G06N 5/02; G06F 16/2465; G06F 16/248
See application file for complete search history.

(56) References Cited

U.S. PATENT DOCUMENTS

| 9,349,212 | B2 | 5/2016 | Cheung et al. | |
|---|---|---|---|---|
| 2003/0004652 | A1* | 1/2003 | Brunner | A01K 1/031 702/19 |
| 2004/0153430 | A1* | 8/2004 | Sayad | G06F 16/283 706/61 |
| 2017/0323028 | A1 | 11/2017 | Jonker et al. | |

(Continued)

OTHER PUBLICATIONS

Mozafari et al., A Handbook for Building an Approximate Query Engine, IEEE Data Eng. Bull., 2015.
(Continued)

*Primary Examiner* — Yuk Ting Choi
(74) *Attorney, Agent, or Firm* — McGuireWoods LLP

(57) ABSTRACT

An apparatus for estimating analytics and interactive exploration of big data, stored and/or streaming, using approximate query processing is presented. The apparatus comprises a model constructor and a sampler. The model constructor identifies important predictors variables in big data using feature selection, predictor variables, and outcome variables and partitions the important predictor variables into one or more stratifications based either the identified interactions or identified relationships. The sampler generates a subset of data by querying the big data using a query constructed based on at least one stratification. The subset of data can be fed into an analytics generator. The analytics generator generates analytics data for the outcome variables based on the subset of data and an analytics algorithm and a visualization, e.g. an interactive visualization, comprising the outcome variables, the important predictor variables, the stratification, the subset of data, and the analytics data.

19 Claims, 3 Drawing Sheets

(56) References Cited

U.S. PATENT DOCUMENTS

| | | | | |
|---|---|---|---|---|
| 2017/0364590 A1* | 12/2017 | Hill | .................... | G06F 16/2465 707/999.003 |
| 2018/0011922 A1* | 1/2018 | Sethumadhavan | .... | G06Q 10/04 706/61 |
| 2019/0005395 A1* | 1/2019 | Dutkowski | ............ | G06N 20/00 706/61 |
| 2019/0286541 A1* | 9/2019 | Sobala | ................... | G06N 20/00 702/19 |
| 2020/0059689 A1* | 2/2020 | Lin | ................. | H04N 21/23406 702/19 |

OTHER PUBLICATIONS

International Search Report dated Mar. 24, 2021, issued in related International Application No. PCT/US2021/012790.

* cited by examiner

SYSTEM FOR RAPID INTERACTIVE EXPLORATION OF BIG DATA

BACKGROUND

Big data can be described as data sets that is too large and/or complex to be analyzed for data of interest using traditional computational platforms, i.e. hardware and/or software. Big data can also be described as extremely large data sets that requires computationally complex analysis to reveal patterns, trends, and associations. Practically, big data sets cannot be moved from its storage location to a specific computing resource or location, e.g. an analytics platform used by a data scientist, because of time or other resource constraints. Stated differently, as a practical matter, in current state of the art analytic platforms, all data points in a big data repository cannot be processed on the respective client or server platform because moving all the data is not practical or even possible. Streaming data can also be understood as a type of big data. Like big data, continuously streaming data cannot be moved in its entirety to a dedicated computing resource. Streaming data is infinitely big data. Performing complex computations on streaming data is not practical, if not impossible. The resources required for such would be prohibitive.

Considering the aforementioned description of big data, if the data becomes so big it can no longer be managed computationally, then the data becomes, in effect, defective data. Stated differently, if the data becomes so big that the time required to perform computational analysis precludes practical use of any exploratory discoveries the data is, in effect, defective data. Furthermore, if the expense required to achieve an acceptable degree of efficiency and accuracy is exclusive or prohibitive, the data, without an alternative solution, is, in effect, defective data. So, the fundamental problem is how to make interactive, efficient, cost effective, and responsive analytics.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1:
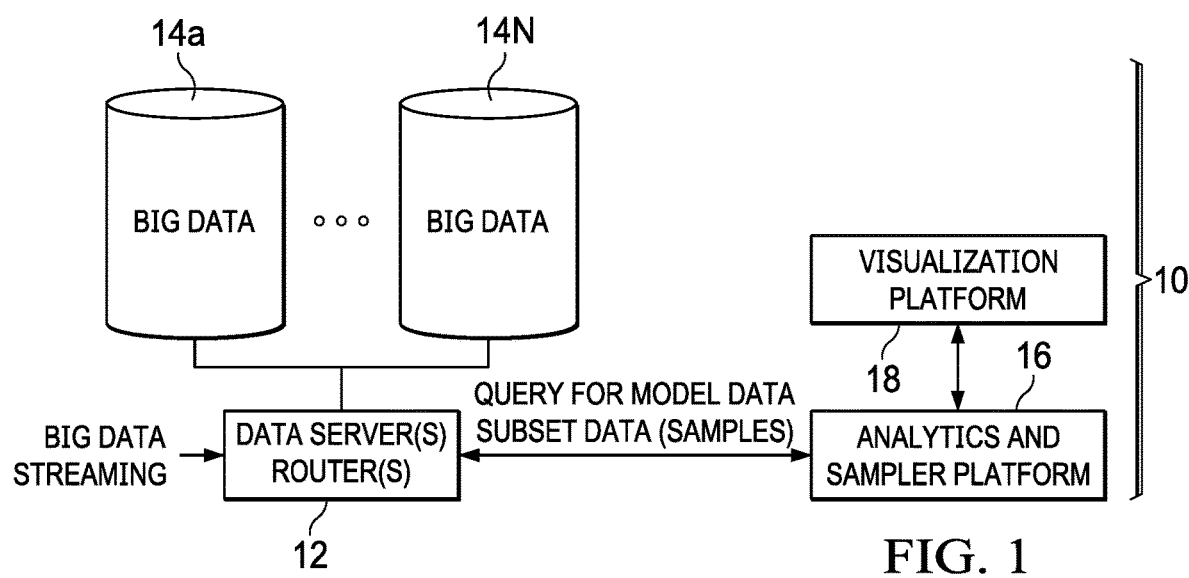
FIG. 1 is an illustration of a diagram of a system for estimating analytics and interactive exploration of big data, in accordance with certain example embodiments.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the current state of the art, or i.e. industry standard practice, significant resources and cost are expended to increase the capacity to move data and analyze data, for example through massive parallelization of computations. However, the ability to collect and store data will for the foreseeable future continue to exceed the ability to analyze the data. Moreover, the problem is exacerbated as analytics moves to the network cloud. The cost of continuously refreshing large data sets, and refreshing analyses based on large data sets, can be prohibitively expensive. Therefore, tremendous incentives exist to provide alternative solutions.

One widely used approach to enable fast statistical, machine learning, and artificial-intelligence (AI) focused analytics or visual exploration based on large or streaming data sets is to apply sampling, and to perform the desired analytic operations on samples rather than complete datasets. For example, in simple random sampling observations are selected from the complete data set with a specific usually known probability or rate. Thus, each observation in the complete dataset will have the same probability of selection, therefore ensuring what is commonly referred to as "representativeness" of the resultant sample with respect to the properties and relationships among variables observed in the population from which the sample was drawn.

However, the values of statistics and properties estimated from samples will only approximate the true values for the statistics and properties if they had been computed from all data. Moreover, the process of extracting samples efficiently from very large data sets (populations of observations) is not trivial. In general, in order to enable fast and efficient analytic computations it is desirable to draw the smallest possible samples from large data in ways that will allow the computation of statistical and predictive analytics quantities with the smallest confidence intervals and thus greatest certainty with respect to the values of the computed quantities if they had been computed from all data.

One advanced data processing method for drawing representative samples is Approximate Query Processing (AQP). AQP is a database processing scheme that focuses on the very difficult problem of how to optimize and implement meaningfully and with the highest fidelity certain standard database operations, such as joins, when operating on samples rather than entire datasets. However, the problem with respect to BI (Business Intelligence) and analytic applications is different from the problem that needs to be addressed to solve efficiency issues as it relates to sampling data sets using standard database operations. Specifically, established statistical research and best practices are well documented on how to estimate certain statistical parameters like means, sums, proportions, etc. and their confidence intervals, based on the sampling distributions of the respective statistics, from specifically constructed samples that stratify on attributes in the data (see, for example, Kish, L., 1965, Survey sampling. New York: Wiley; or Duncan, A. J., 1986. Quality control and industrial statistics. 5th ed. Chicago: Irwin.).

In addition, bootstrap sampling methods are well known to be useful for constructing confidence intervals for statistics when closed-form expressions do not exist. For example, for many moment statistics such as means, standard deviations, etc. closed form formulas exist where—based on statistical theory and statistical power estimation alone—sampling distributions and thus confidence intervals for specific sample sizes can be estimated. However, for many non-parametric statistics or parameters for machine learning methods, no such closed-form formulas exist, and hence repeated bootstrap-sampling has to be applied in order to estimate sampling distributions and confidence intervals for the respective statistics. For details, see, for example, Mozafari, B. & Niu, N., "A Handbook for Building an Approximate Query Engine," Bulletin of the IEEE Computer Society Technical Committee on Data Engineering; see also https://web.eecs.umich.edu/~mozafari/php/data/uploads/approx_chapter.pdf).

Valid statistical summaries and their confidence intervals can be efficiently computed from data samples, regardless of the size of the population, i.e., the total size of the data. Instead, the confidence intervals and thus accuracy of estimates of means, standard deviations, sums, totals, counts, etc. will depend on the sample size, and the nature of the sample. In particular, stratified samples can often yield much more precise estimates (with smaller confidence intervals) of such statistics when compared to simple-random-samples. Stratified samples are those where certain strata in the data that were identified a-priori are sampled separately with the same or different sampling probability (rate). For example, a sample of public opinions may be stratified by Gender and Household Income, which means that separate samples with certain sampling probabilities are drawn from the population for each of the strata Males-Females, Low-Medium-High Income Households, and so on. Importantly, the relative efficiency of stratified samples with respect to resultant confidence intervals of estimates is a function of the strengths of the relationship between the stratification attributes (variables) and measurements under consideration. The greater the differences between strata with respect to the mean or other computed quantity of interest for the measurements under consideration, that is, the stronger the differentiation is between the strata, the stronger is the relationship between the stratification attributes (variables) to the measurements under consideration, and thus the smaller a stratified sample can be taken to achieve the same degree of certainty (same confidence intervals) with respect to the statistical quantities computed from the sample. Likewise, given a certain sample size, a stratified sample (compared to a simple random sample) will yield smaller confidence intervals with respect to the statistical quantities computed from the sample, to the extent that the stratification attributes (variables) show a strong relationship to the measurements under consideration.

For example, suppose one was interested in estimating the average height of humans. A stratified sample can be drawn, stratifying on some attribute unrelated to height, such as month-of-the-year of one's birthday. Intuition would indicate that stratifying by month-of-the-year would not provide any advantages over a simple random sample because the height of humans born in certain months is probably very similar if not the same. However, stratifying by genetic gender, for example, would allow one to take a relatively smaller overall sample, separately for genetic males and females, because males are on average taller than females. Therefore, the means for different strata could be combined to arrive at a more accurate estimate of average height when compared to a simple random sample of equal total size. Again, these intuitions are supported through statistical theory, and in the statistical literature.

Presented herein are a system and method for estimating analytics and interactive exploration of big data using a combination of data models, Machine Learning (ML)/Artificial Intelligence (AI) algorithms, and query processing techniques to extract relevant, meaningful data in a time efficient and cost effective manner. Analysis of big (or big streaming) data and the interaction therewith must operate on samples, i.e. on a subset of the data, from which statistical analyses, prediction models, clustering models, and interactive BI (Business Intelligence) visualizations are produced, if an interactive, efficient, cost effective, and responsive analytic solution is to be realized.

In an embodiment, Approximate Query Processing (AQP) is used to significantly increase the performance of queries against big data and streaming data by applying sampling and stratified sampling methods. To summarize, the efficiency and accuracy (confidence intervals) of estimates derived from stratified samples can be improved if the attributes most strongly related to the variables of interest (for which statistics are to be estimated) are chosen for stratification. Put another way, if one knew ahead of time the specific nature of the optimal stratification in the data then the smallest samples could be drawn to arrive at a specific pre-defined levels of accuracy for the statistic that is to be estimated.

Another aspect and further improvement in statistical analysis, Machine Learning, and AI is to apply so-called incremental learning algorithms to estimate statistical or other computed quantities. Unlike typical implementations of algorithms to compute means, standard deviations, clusters, predictive models, or other computed quantities, when using incremental algorithms, as each observation is first encountered by the computational engine it is used to refine the accuracy of the computed quantities. For example, when computing an average a simple approach might be to compute the sum of values over all observations, and then divide that sum by the number of observations. Using an incremental learning algorithm such as the so-called Method of Provisional Means (see Dixon, Wilfrid J., & Brown, Morton B., 1983, BMDP Statistical Software, Volume 1, University of California, Los Angeles Department of Biomathematics, page 662) can be used to continuously update and refine the estimate of the mean as new data are processed, and processing can be terminated when a desired accuracy (confidence interval) for the mean has been achieved, before and without processing all data.

Incremental learning algorithms are particularly useful in the context of big and streaming data because they can approximate result statistics, predictive models, or clustering models while passing through the big data or processing continuously streaming data, without the need to process or iteratively process all data. One such algorithm of interest is the so-called Hoeffding Tree algorithm (see for example Bifet, A., Holmes, G., Kirkby, R., & Pfahringer, B., 2011, Data Stream Mining: A Practical Approach. Centre for Open Source Software Innovation), and similar methods derived from this algorithm. Tree algorithms generally allow for the discovery of decision rules involving multiple inputs to predict a continuous or categorical outcome variable of interest. The Hoeffding Tree allows building such decision trees from streaming data, using an incremental learning algorithm rather than other common decision tree building algorithms that require multiple passes through all the available data. Decision tree models allow for predictions of outcomes of interest from input variables using logical decision rules such as "If Variable V1>Value X1 and Variable V2<Value X2, . . . , and Variable VK>XK then Outcome Variable Value O=Value Y". Therefore, such decision rules can not only model and reflect interaction effects to a certain depth K where the effect of one or more input variables (e.g., V1) on an outcome are modified by one or more other input variables (e.g., V1, V2, . . . , V(k−1)), but also identify the specific cutoff values (X1, X2, . . . , Xk) with respect to the input variables that will yield the strongest relationship between predictions from a specific decision tree and the observed values in the outcome.

In an embodiment, incremental learning algorithms and AQP are combined in to a single apparatus wherein the combination can be used to generate data models and samples, i.e., subsets of data, from big data repositories and/or streams in an efficient and accurate manner. In another embodiment, the incremental learning algorithms, the model constructor, and an analytics generator are combined in to a single system for providing a means by which a user can interact with sampled data and related analytics.

In another embodiment, non-incremental learning algorithms are applied against continuously updated samples (windows) of data derived via AQP are combined in to a single apparatus wherein the combination can be used to generate data models and samples, i.e., subsets of data, from big data repositories and/or streams in an efficient and accurate manner. In another embodiment, the non-incremental learning algorithms, the model constructor, and an analytics generator are combined in to a single system for providing a means by which a user can interact with sampled data and related analytics.

In another embodiment, incremental and non-incremental learning algorithms are applied to samples of data derived via AQP, and continuously updated against continuously updated samples derived via AQP to derive modified or updated statistical quantities, data models for prediction, clustering, or data description. Such continuously updated statistical analyses, prediction models, clustering models, or statistical quantities can dynamically adjust to newly found relationships detected in the continuously sampled data.

In this specification, big data can mean big data at-rest, i.e., stored in repositories, and streaming big data. Data model means a subset of observations selected from big data based on predictor variables, outcome variables, and relationship, i.e., strength of relationship between variables for subsequent statistical analysis processing, such as prediction and clustering. Strength of relationship can be between predictor variables and outcome variables. Observations are logical rows in the big data and include all predictor variables and outcome variables. Predictor variables and outcome variables are logical columns from big data. Predictor variables are variables used to predict an outcome. Outcome variables are variables in which their value is dependent on a predictor variable or predictor variables. Feature selection means an algorithm that can identify and select variables within big data that contribute to the predictor variables and outcome variables. Variable interaction means that the contribution of one predictor variable is modified by one or many other predictor variables, so that the combined contribution of all variables involved in the interaction is greater than the simple sum over the individual contributions attributable to each variable. Incremental machine learning means a statistical, Machine Learning, or Artificial Intelligence (AI) algorithm that can modify and update an instant data model based on newly obtained single or multiple observations without the need to reprocess and iterate over all previously processed observations. Stratification means a classification of parameters or a classification of parameters and values. For example, a stratification by age in a population can mean that different age groups are different with respect to one or more variables, such as risk. Partitioning (binning) means the active separation or grouping of observations based on stratification applied to one or more variables. AQP and AQP samples, as used within the context of this specification is a non-traditional AQP method and technique wherein database processing efficiencies are enhanced by creating queries based on a data model constructed using feature selection. Discrete or categorical variables are variables that have a limited number of discrete values. Continuous variables are numeric variables that have an infinite number of values. A sample is a subset of data from a data model, large or big data set, or continuously streaming data. Subset of data means another subset of observations. Data means at least one variable and a variable is a parameter and a value. Continuously means a processing act that is performed continuously during an interactive data exploration session. Depth of decision tree is a quantity that defines the maximum number of variables involved in any of the decision rules that define a decision tree, as for example derived via the Hoeffding algorithm or other incremental or non-incremental learning algorithms. Interactive visualization means a display of subsets of data (i.e., subsets of variables) in the form of graphs, charts, or tables, or any combination thereof and the user interaction of such data.

Referring now to FIG. 1, illustrated is a diagram of a system for estimating analytics and interactive exploration of big data, according to certain example embodiments, denoted generally as 10, coupled with a big data system. The big data system comprises at least one data server 12, which includes at least one router, and big data repositories 14. The system 10 comprises an analytics and sampler platform 16 and a visualization platform 18. The analytics and sampler platform 16 receives input from the visualization platform 18 and generates output in the form of visualizations based on analytical analysis of samples of the big data. The samples are created using a model constructor, a sampler, and provided predictor variables and outcome variables. The analytics and sampler platform 16 can use a server application or a router application to query one of or both of the at-rest big data, i.e. data in the repository, and/or the streaming big data. The analytics and sampler platform 16 constructs a first query to find within the big data important predictor variables based on the provided predictor variables and outcome variables. A data model is constructed based on the results of the first query and analysis of the results using at least one incremental machine learning algorithm. A second query is constructed to query the big data based on information from the model and at least one stratification derived using AQP techniques. The results, along with other data, of the second query are displayed through visualizations for consumer consumption.

Figure 2:
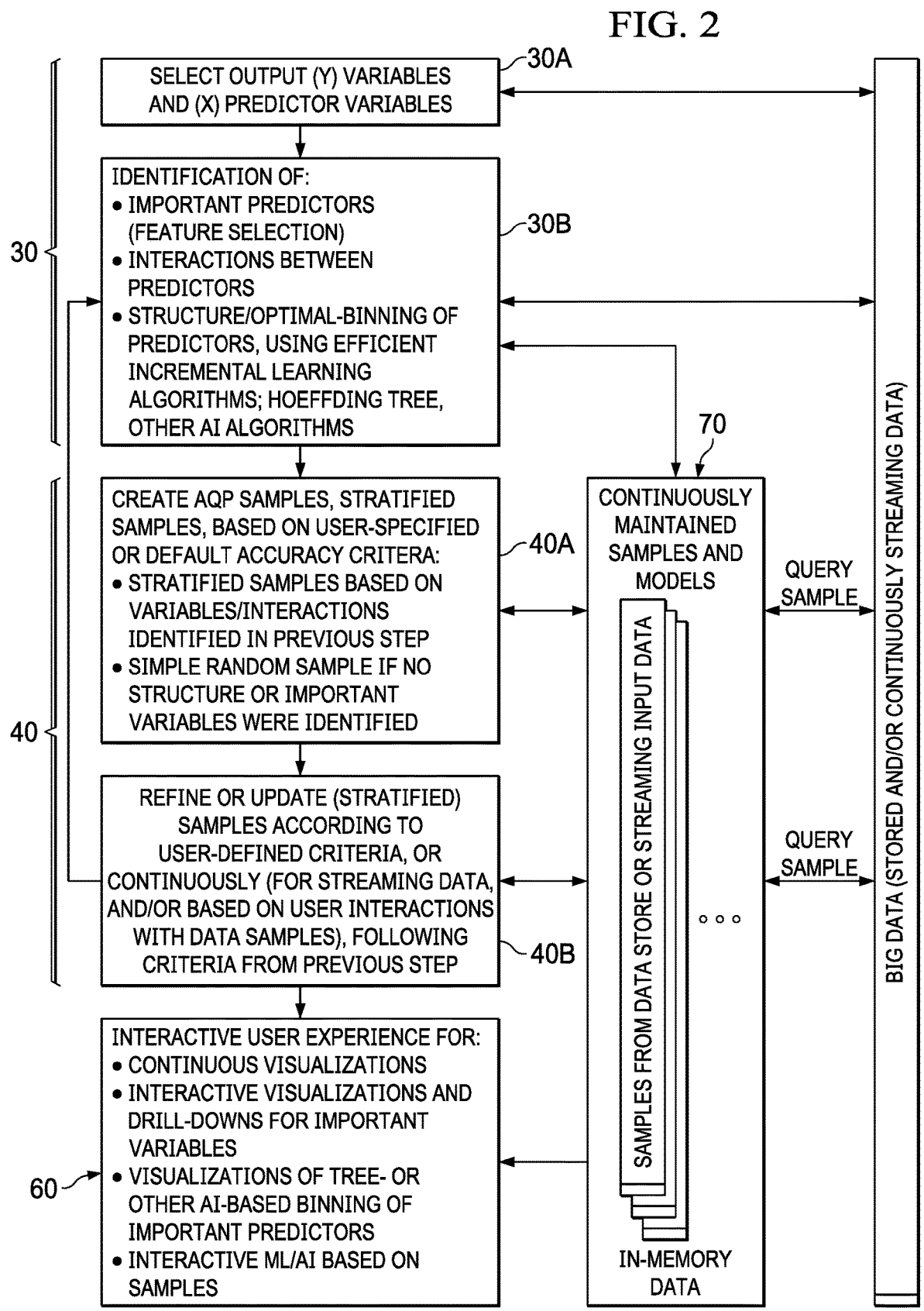
FIG. 2 is an illustration of a flow diagram of an algorithm for estimating analytics and interactive exploration of big data, in accordance with certain example embodiments.

Referring now to FIG. 2, illustrated is a flow diagram of an algorithm for estimating analytics and interactive exploration of big data, according to certain example embodiments. The algorithm comprises a model constructor 30, a sampler 40, and analytics and visualizations generator 60 that enables the extraction of relevant, meaningful data in a time efficient and cost effective manner for the purpose of interactive exploration and subsequent statistical, Machine Learnings, AI, and other data analyses.

The model constructor 30 begins at block 30A where provided outcome variables and predictor variables, e.g. provided from a previously generated visualization and user selection, are used to identify in the big data variables of interest, i.e. predictor variables and outcome variables of interest. At block 30B, feature selection that uses an incremental learning algorithm, such as Hoeffding tree, or other similar AI algorithms, is used to identify important, i.e. most relevant, predictor variables that contribute the most to the outcome variable or variables. Additionally, interactions between variables that affect the outcome variables are identified. In an embodiment, the identification process can be continuous. Also, statistical data and a data structure or structures, i.e. a predictive model or models, are generated. The data models can be stored in permanent storage and an instant data model can be updated based on previously stored samples, models, and updated predictor and outcome variables. The statistical data and data structure or structures can be used to predict an outcome variable or variables.

In an embodiment, a user can specify an accuracy criteria or a default accuracy criteria. The accuracy of the results can be affected by the specified criteria but processing time is reduced. For example, a user can specify a desired maximum error limit and confidence interval for specific statistics of interest. A user can also specify a desired drill-down depth for decision trees prediction models such as Hoeffding Trees and others that is to be determined. In this case, computations are continued until the desired level of structure, e.g. depth of a decision tree, or other properties or constructs that describe structure, has been identified in the data. The user-defined parameters are translated into suitable algorithms that are pushed into a big-data platform (in-database processing) or applied to big streaming data. As such, subsequent feature selection and the incremental learning algorithm operations are abbreviated.

The aforementioned algorithms enable learning from data as the data are being read, and without reading all available data. Instead, the respective tree-partitions, for example, are updated as new data are streaming through the algorithm and until the learning process terminates as requested through a user-defined criteria. These algorithmic computations can be flexibly deployed and applied to streaming data sources as well as performed in distributed in-memory computation environments, e.g. using Apache Spark™. Stated differently, the computation can be performed in-database in a distributed networked environment. As a result, the most important variables and their partitioning (binning) and interactions that maximize the relationship to the outcome variables of interest can be identified, without processing all available data points, with user-controlled computational resources, and within user-defined acceptable time. Moreover, the system enables updates to the in-memory sample data. Thus, updated stratified samples are maintained (in in-memory data tables) as data continue to stream into the proposed system (in the streaming data case).

At block 40A, AQP samples are created. AQP is used to construct a query based on stratifications and the data model created in block 30B. Stratified sampling is most informative, compared to random sampling, to the extent that the stratification creates strata that are maximally differentiated. The constructed query is used to query big data in order to create a sample, i.e. a subset of data. Created samples are maintained continuously in-memory, and optionally in permanent storage. Alternatively, if no structure or important variables were identified in block 30B, a simple random sample can be performed. At block 40B, a feedback loop is created that allows for the re-execution of block 30B and the in-database update of the samples using updated variables, for example from user interaction with created sample. In an embodiment, the re-execution of block 30B can be continuous, with or without update variables, in the case of streaming big data.

At block 60, visualizations in the form of graphs, charts, tables, and analytics data are generated. In an embodiment, the visualizations are interactive and continuous, e.g. in response to big streaming data. The in-memory variables define specific important features, their optimal partitioning, and their interactions. Other ML/AI algorithms, such as recursive partitioning methods or other applicable machine learning methods used in most analytics platform, can be performed on the in-memory data in an efficient manner.

Figure 3:
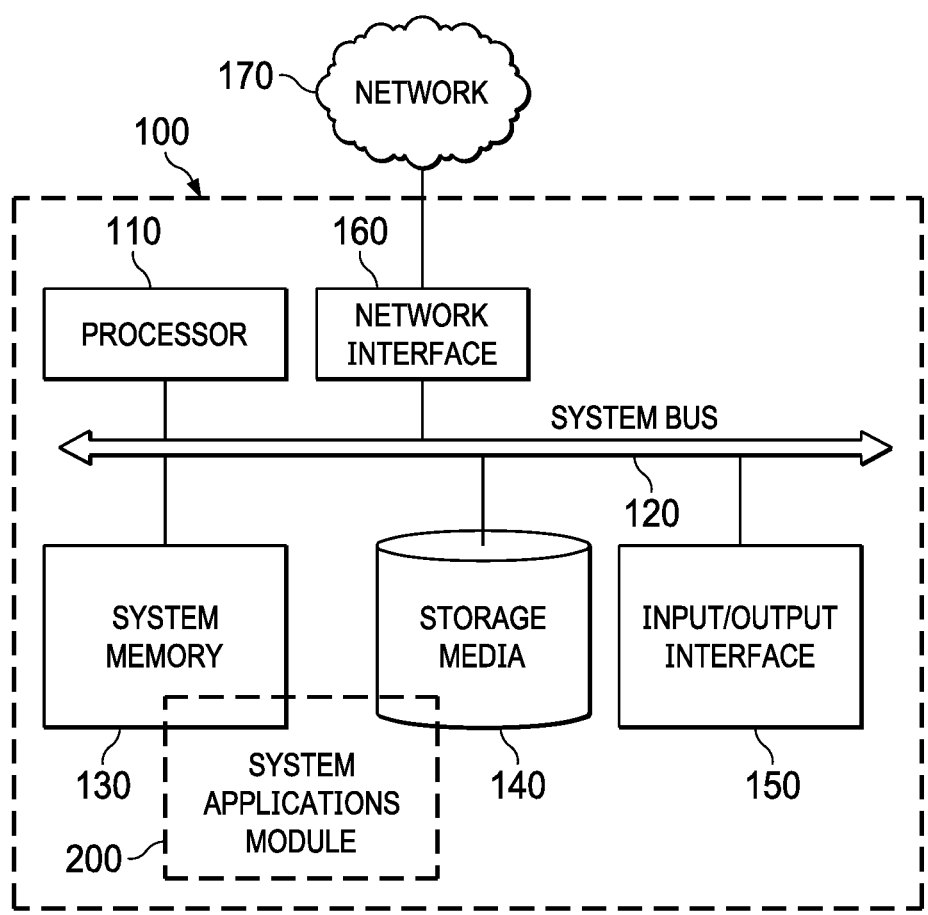
FIG. 3 is an illustration of a computing machine for processing data and selecting the optimal predictive model selection and executing the optimal predictive model, in accordance with certain example embodiments.

Referring now to FIG. 3, illustrated is a computing machine 100 and a system applications module 200, in accordance with example embodiments. The computing machine 100 can correspond to any of the various computers, mobile devices, laptop computers, servers, embedded systems, or computing systems presented herein. The module 200 can comprise one or more hardware or software elements, e.g. other OS application and user and kernel space applications, designed to facilitate the computing machine 100 in performing the various methods and processing functions presented herein. The computing machine 100 can include various internal or attached components such as a processor 110, system bus 120, system memory 130, storage media 140, input/output interface 150, and a network interface 160 for communicating with a network 170, e.g. a loopback, local network, wide-area network, cellular/GPS, Bluetooth, WIFI, and WIMAX.

The computing machine 100 can be implemented as a conventional computer system, an embedded controller, a laptop, a server, a mobile device, a smartphone, a wearable computer, a customized machine, any other hardware platform, or any combination or multiplicity thereof. The computing machine 100 and associated logic and modules can be a distributed system configured to function using multiple computing machines interconnected via a data network and/or bus system.

The processor 110 can be designed to execute code instructions in order to perform the operations and functionality described herein, manage request flow and address mappings, and to perform calculations and generate commands. The processor 110 can be configured to monitor and control the operation of the components in the computing machines. The processor 110 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 110 can be a single processing unit, multiple processing units, a single processing core, multiple processing cores, special purpose processing cores, co-processors, or any combination thereof. According to certain embodiments, the processor 110 along with other components of the computing machine 100 can be a software based or hardware based virtualized computing machine executing within one or more other computing machines.

The system memory 130 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 130 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 130. The system memory 130 can be implemented using a single memory module or multiple memory modules. While the system memory 130 is depicted as being part of the computing machine, one skilled in the art will recognize that the system memory 130 can be separate from the computing machine 100 without departing from the scope of the subject technology. It should also be appreciated that the system memory 130 can include, or operate in conjunction with, a non-volatile storage device such as the storage media 140.

The storage media 140 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 140 can store one or more operating systems, application programs and program modules, data, or any other information. The storage media 140 can be part of, or connected to, the computing machine. The storage media 140 can also be part of one or more other computing machines that are in communication with the computing machine such as servers, database servers, cloud storage, network attached storage, and so forth.

The applications module 200 and other OS application modules can comprise one or more hardware or software elements configured to facilitate the computing machine with performing the various methods and processing functions presented herein. The applications module 200 and other OS application modules can include one or more algorithms or sequences of instructions stored as software or firmware in association with the system memory 130, the storage media 140 or both. The storage media 140 can therefore represent examples of machine or computer readable media on which instructions or code can be stored for execution by the processor 110. Machine or computer readable media can generally refer to any medium or media used to provide instructions to the processor 110. Such machine or computer readable media associated with the applications module 200 and other OS application modules can comprise a computer software product. It should be appreciated that a computer software product comprising the applications module 200 and other OS application modules can also be associated with one or more processes or methods for delivering the applications module 200 and other OS application modules to the computing machine via a network, any signal-bearing medium, or any other communication or delivery technology. The applications module 200 and other OS application modules can also comprise hardware circuits or information for configuring hardware circuits such as microcode or configuration information for an FPGA or other PLD. In one exemplary embodiment, applications module 200 and other OS application modules can include algorithms capable of performing the functional operations described by the flow charts and computer systems presented herein.

The input/output ("I/O") interface 150 can be configured to couple to one or more external devices, to receive data from the one or more external devices, and to send data to the one or more external devices. Such external devices along with the various internal devices can also be known as peripheral devices. The I/O interface 150 can include both electrical and physical connections for coupling the various peripheral devices to the computing machine or the processor 110. The I/O interface 150 can be configured to communicate data, addresses, and control signals between the peripheral devices, the computing machine, or the processor 110. The I/O interface 150 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 150 can be configured to implement only one interface or bus technology. Alternatively, the I/O interface 150 can be configured to implement multiple interfaces or bus technologies. The I/O interface 150 can be configured as part of, all of, or to operate in conjunction with, the system bus 120. The I/O interface 150 can include one or more buffers for buffering transmissions between one or more external devices, internal devices, the computing machine, or the processor 120.

The I/O interface 120 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 120 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 100 can operate in a networked environment using logical connections through the NIC 160 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 110 can be connected to the other elements of the computing machine or the various peripherals discussed herein through the system bus 120. It should be appreciated that the system bus 120 can be within the processor 110, outside the processor 110, or both. According to some embodiments, any of the processors 110, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a system for estimating analytics and interactive exploration of big data, the system comprising: a model constructor configured to: identify in the big data important predictors variables using feature selection, at least one predictor variable, and at least one outcome variable; identify in the big data at least one of interactions between the important predictor variables and relationships of structure in the important predictor variables using an incremental machine learning algorithm; and partition the important predictor variables into at least one stratification based on at least one of the identified interactions and identified relationships; and a sampler configured to: generate a subset of data by querying the big data using a query constructed based on the at least one stratification; an analytics generator configured to: generate analytics data for the at least one outcome variable based on the subset of data and at least one analytics algorithm; and generate at least one visualization comprising at least one of the at least one outcome variable, the important predictor variables, the at least one stratification, the subset of data, and the analytics data; wherein the big data is at least one of stored data and streaming data;

Clause 2, the system of clause 1, wherein the at least one predictor variable and the at least one outcome variable are update variables and the subset of data is an updated subset of data;

Clause 3, the system of clause 2, wherein the update variables are updated based on at least one of a user-defined criteria, at least one previously maintained subset of data, and streaming data;

Clause 4, the system of clause 1, wherein the important predictor variables are identified and partitioned using at least one tree algorithm; wherein the query is constructed using approximate query processing;

Clause 5, the system of clause 1, wherein the predictor variables and outcome variables are at least one of continuous and categorical variables of interest selected from logical data columns;

Clause 6, the system of clause 1, wherein the sampler is further configured to generate the subset of data by querying the big data using a query constructed based on the at least one stratification according to an accuracy criteria;

Clause 7, the system of clause 6, wherein the accuracy criteria is one of time and an acceptable error limit;

Clause 8, an apparatus for estimating analytics and interactive exploration of big data, the apparatus comprising: a model constructor configured to: identify, continuously and in-memory, in the big data at least one of interactions between the important predictor variables and relationships of structure in the important predictor variables using an incremental machine learning algorithm; partition, continuously, important predictor variables into at least one stratification based on at least one of the identified interactions and identified relationships; and a sampler configured to: generate, continuously and in-memory, a subset of data by querying the big data using a query constructed based on the at least one stratification; wherein the big data is at least one of stored data and streaming data;

Clause 9, the apparatus of clause 8, wherein the model constructor is further configured to: identify in the big data important predictors variables using feature selection, at least one predictor variable, and at least one outcome variable;

Clause 10, the apparatus of clause 8, further comprising: an analytics generator configured to: generate analytics data for the at least one outcome variable based on the subset of data and at least one analytics algorithm; and generate at least one visualization comprising at least one of the at least one outcome variable, the important predictor variables, the at least one stratification, the subset of data, and the analytics data;

Clause 11, the apparatus of claim 8, wherein the at least one predictor variable and the at least one outcome variable are update variables and the subset of data is an updated subset of data;

Clause 12, the apparatus of clause 11, wherein the update variables are updated based on at least one of a user-defined criteria, at least one previously maintained subset of data, and streaming data;

Clause 13, the apparatus of clause 8, wherein the important predictor variables are identified and partitioned using at least one tree algorithm; wherein the query is constructed using approximate query processing;

Clause 14, the apparatus of clause 8, wherein the predictor variables and outcome variables are at least one of continuous and categorical variables of interest selected from logical data columns;

Clause 15, the apparatus of clause 8, wherein the sampler is further configured to generate the subset of data by querying the big data using a query constructed based on the at least one stratification according to an accuracy criteria;

Clause 16, the system of clause 14, wherein the accuracy criteria is one of time and an acceptable error limit;

Clause 17, a method for estimating analytics and interactive exploration of big data, the method comprising: identify in the big data important predictors variables using feature selection, at least one predictor variable, and at least one outcome variable; identify in the big data at least one of interactions between the important predictor variables and relationships of structure in the important predictor variables using an incremental machine learning algorithm; partition the important predictor variables into at least one stratification based on at least one of the identified interactions and identified relationships; generate a subset of data by querying the big data using a query constructed based on the at least one stratification; generate analytics data for the at least one outcome variable based on the subset of data and at least one analytics algorithm; and generate at least one visualization comprising at least one of the at least one outcome variable, the important predictor variables, the at least one stratification, the subset of data, and the analytics data; wherein the big data is at least one of stored data and streaming data;

Clause 18, the method of clause 15, wherein the at least one predictor variable and the at least one outcome variable are update variables and the subset of data is an updated subset of data, and, wherein the update variables are updated based on at least one of a user-defined criteria, at least one previously maintained subset of data, and streaming data;

Clause 19, the method of clause 17, wherein the important predictor variables are identified and partitioned using at least one tree algorithm; wherein the query is constructed using approximate query processing; and Clause 20, the method of clause 17, further comprises: generating the subset of data by querying the big data using a query constructed based on the at least one stratification according to an accuracy criteria; wherein the accuracy criteria is one of time and an acceptable error limit; wherein the predictor variables and outcome variables are at least one of continuous and categorical variables of interest selected from logical data columns.

What is claimed is:

1. A system for estimating analytics and interactive exploration of big data, the system comprising:
a model constructor configured to:
identify in the big data predictors variables using feature selection, at least one predictor variable, and at least one outcome variable;
identify in the big data at least one of interactions between the predictor variables and relationships of structure in the predictor variables using an incremental machine learning algorithm until a desired level of structure has been identified based on a user-defined criteria, wherein the incremental machine learning is used to update the predictor variables based on newly obtained data without a need to reprocess over all previously processed data, wherein the model constructor is further configured to identify a contribution of one predictor variable of the predictor variables as modified by one or more other predictor variables of the predictor variables to identify an interaction of the at least one interactions between the predicator variables, wherein a combined contribution of all predicator variables involved in the interaction is greater than a simple sum over individual contributions of each of the predictor variables;
interaction means that the contribution of one predictor variable is modified by one or many other predictor variables, so that the combined contribution of all variables involved in the interaction is greater than the simple sum over the individual contributions attributable to each variable;
partition the predictor variables into at least one stratification based on at least one of the identified interactions and identified relationships; and
a sampler configured to:
generate a subset of data by querying the big data using a query constructed based on the at least one stratification;
an analytics generator configured to:
generate analytics data for the at least one outcome variable based on the subset of data and at least one analytics algorithm; and
generate at least one visualization comprising at least one of the at least one outcome variable, the predictor variables, the at least one stratification, the subset of data, and the analytics data;
wherein the big data is at least one of stored data and streaming data.

2. The system of claim 1, wherein the at least one predictor variable and the at least one outcome variable are update variables and the subset of data is an updated subset of data.

3. The system of claim 1, wherein the predictor variables are identified and partitioned using at least one tree algorithm; wherein the query is constructed using approximate query processing.

4. The system of claim 1, wherein the predictor variables and outcome variables are at least one of continuous and categorical variables of interest selected from logical data columns.

5. The system of claim 1, wherein the sampler is further configured to generate the subset of data by querying the big data using a query constructed based on the at least one stratification according to an accuracy criteria.

6. The system of claim 5, wherein the accuracy criteria is one of time and an acceptable error limit.

7. An apparatus for estimating analytics and interactive exploration of big data, the apparatus comprising:
a model constructor configured to:
continuously identify in the big data at least one of interactions between the predictor variables and relationships of structure in the predictor variables using an incremental machine learning algorithm until a desired level of structure has been identified based on a user-defined criteria, wherein the incremental machine learning is used to update the predictor variables based on newly obtained data without a need to reprocess over all previously processed data, wherein the model constructor is further configured to identify a contribution of one predictor variable of the predictor variables as modified by one or more other predictor variables of the predictor variables to identify an interaction of the at least one interactions between the predicator variables, wherein a combined contribution of all predicator variables involved in the interaction is greater than a simple sum over individual contributions of each of the predictor variables;
partition, continuously, predictor variables into at least one stratification based on at least one of the identified interactions and identified relationships; and
a sampler configured to:
continuously generate a subset of data by querying the big data using a query constructed based on the at least one stratification;
wherein the big data is at least one of stored data and streaming data.

8. The apparatus of claim 7, wherein the model constructor is further configured to:
identify in the big data predictors variables using feature selection, at least one predictor variable, and at least one outcome variable.

9. The apparatus of claim 7, further comprising:
an analytics generator configured to:
generate analytics data for the at least one outcome variable based on the subset of data and at least one analytics algorithm; and
generate at least one visualization comprising at least one of the at least one outcome variable, the predictor variables, the at least one stratification, the subset of data, and the analytics data.

10. The apparatus of claim 7, wherein the at least one predictor variable and the at least one outcome variable are update variables and the subset of data is an updated subset of data.

11. The apparatus of claim 7, wherein the predictor variables are identified and partitioned using at least one tree algorithm; wherein the query is constructed using approximate query processing.

12. The apparatus of claim 7, wherein the predictor variables and outcome variables are at least one of continuous and categorical variables of interest selected from logical data columns.

13. The apparatus of claim 7, wherein the sampler is further configured to generate the subset of data by querying the big data using a query constructed based on the at least one stratification according to an accuracy criteria.

14. The system of claim 12, wherein the accuracy criteria is one of time and an acceptable error limit.

15. A method for estimating analytics and interactive exploration of big data, the method comprising:
    identify in the big data predictors variables using feature selection, at least one predictor variable, and at least one outcome variable;
    identify in the big data at least one of interactions between the predictor variables and relationships of structure in the predictor variables using an incremental machine learning algorithm until a desired level of structure has been identified based on a user-defined criteria, wherein the incremental machine learning is used to update the predictor variables based on newly obtained data without a need to reprocess over all previously processed data, wherein identifying an interaction of the at least one interactions comprises identifying a contribution of one predictor variable of the predictor variables as modified by one or more other predictor variables of the predictor variables, wherein a combined contribution of all predicator variables involved in the interaction is greater than a simple sum over individual contributions of each of the predictor variables;
    partition the predictor variables into at least one stratification based on at least one of the identified interactions and identified relationships;
    generate a subset of data by querying the big data using a query constructed based on the at least one stratification;
    generate analytics data for the at least one outcome variable based on the subset of data and at least one analytics algorithm; and
    generate at least one visualization comprising at least one of the at least one outcome variable, the predictor variables, the at least one stratification, the subset of data, and the analytics data;
    wherein the big data is at least one of stored data and streaming data.

16. The method of claim 15, wherein the at least one predictor variable and the at least one outcome variable are update variables and the subset of data is an updated subset of data.

17. The method of claim 15, wherein the predictor variables are identified and partitioned using at least one tree algorithm; wherein the query is constructed using approximate query processing.

18. The method of claim 15, further comprises:
    generating the subset of data by querying the big data using a query constructed based on the at least one stratification according to an accuracy criteria;
    wherein the accuracy criteria is one of time and an acceptable error limit;
    wherein the predictor variables and outcome variables are at least one of continuous and categorical variables of interest selected from logical data columns.

19. A system for estimating analytics and interactive exploration of big data, the system comprising:
    a storage medium; and
    one or more processors configured to:
        identify in the big data predictors variables using feature selection, at least one predictor variable, and at least one outcome variable;
        identify in the big data at least one of interactions between the predictor variables and relationships of structure in the predictor variables using an incremental machine learning algorithm until a desired level of structure has been identified based on a user-defined criteria, wherein the incremental machine learning is used to update the predictor variables based on newly obtained data without a need to reprocess over all previously processed data, wherein identifying an interaction of the at least one interactions comprises identifying a contribution of one predictor variable of the predictor variables as modified by one or more other predictor variables of the predictor variables, wherein a combined contribution of all predicator variables involved in the interaction is greater than a simple sum over individual contributions of each of the predictor variables;
        partition the predictor variables into at least one stratification based on at least one of the identified interactions and identified relationships;
        generate a subset of data by querying the big data using a query constructed based on the at least one stratification;
        generate analytics data for the at least one outcome variable based on the subset of data and at least one analytics algorithm; and
        generate at least one visualization comprising at least one of the at least one outcome variable, the predictor variables, the at least one stratification, the subset of data, and the analytics data;
    wherein the big data is at least one of stored data and streaming data.

* * * * *